(12) United States Patent
Stimac (10) Patent No.: US 10,427,038 B2
(45) Date of Patent: Oct. 1, 2019

(54) GAME CONSOLE INCORPORATING BEAM-SPLITTER DISPLAY AND REAL WORLD OBJECTS

(71) Applicant: Toccata Gaming International, LLC, Kimberly, WI (US)

(72) Inventor: Todd R. Stimac, Windsor, WI (US)

(73) Assignee: Toccata Gaming International, LLC, Kimberly, WI (US)

( * ) Notice: Subject to any disclaimer, the term of this patent is extended or adjusted under 35 U.S.C. 154(b) by 376 days.

(21) Appl. No.: 15/002,795

(22) Filed: Jan. 21, 2016

(65) Prior Publication Data

US 2017/0209788 A1    Jul. 27, 2017

(51) Int. Cl.
| | |
|---|---|
| A63F 13/25 | (2014.01) |
| A63F 13/90 | (2014.01) |
| A63F 9/24 | (2006.01) |

(52) U.S. Cl.
CPC .............. *A63F 13/25* (2014.09); *A63F 13/90* (2014.09); *A63F 9/24* (2013.01)

(58) Field of Classification Search
CPC .............. A63F 13/25; A63F 9/24; A63F 13/90
See application file for complete search history.

(56) References Cited

U.S. PATENT DOCUMENTS

| | | | |
|---|---|---|---|
| 5,122,672 A | 6/1992 | Mansour | |
| 5,421,589 A * | 6/1995 | Monroe | A63F 13/08 345/9 |
| 6,054,969 A * | 4/2000 | Haisma | G02B 27/2221 345/7 |
| 6,196,687 B1 * | 3/2001 | Smith | H04N 9/28 348/745 |
| 6,275,213 B1 | 8/2001 | Tremblay et al. | |
| 6,280,327 B1 | 8/2001 | Leifer et al. | |
| 6,285,379 B1 | 9/2001 | Gallery | |
| 6,424,333 B1 | 7/2002 | Tremblay et al. | |
| 6,850,221 B1 | 2/2005 | Tickle | |
| 6,878,066 B2 | 4/2005 | Leifer et al. | |
| 8,537,231 B2 | 9/2013 | Mekenkamp et al. | |
| 8,986,125 B2 | 3/2015 | Ellsworth | |

(Continued)

FOREIGN PATENT DOCUMENTS

| | | |
|---|---|---|
| EP | 1 818 087 A1 | 8/2007 |
| KR | 1020070063928 A | 6/2007 |
| WO | 2014/198623 A1 | 12/2014 |

OTHER PUBLICATIONS

EIC 3700 STIC Search.*

(Continued)

*Primary Examiner* — Xuan M Thai
*Assistant Examiner* — Malina D. Blaise
(74) *Attorney, Agent, or Firm* — Joseph T. Leone, Esq.; DeWitt LLP (57) ABSTRACT

A game console having a beam splitter disposed in a housing and a projector that projects images onto the beam splitter that are reflected so that a player can see the images. Real world objects and/or additional projectors are positioned behind the beam splitter relative to the player and transmit images through the beam splitter so that the player can see them. In this fashion, during game play the player simultaneously sees images that are reflected from the beam splitter and images that are transmitted through the beam splitter.

13 Claims, 4 Drawing Sheets

(56) References Cited

U.S. PATENT DOCUMENTS

| | | | |
|---|---|---|---|
| 2002/0051070 A1* | 5/2002 | Ortyn | C07K 1/047 348/335 |
| 2003/0166417 A1* | 9/2003 | Moriyama | A63F 7/02 463/46 |
| 2004/0192430 A1* | 9/2004 | Burak | G02B 27/2214 463/20 |
| 2006/0100014 A1* | 5/2006 | Griswold | G07F 17/3202 463/31 |
| 2008/0090658 A1 | 4/2008 | Kaji et al. | |
| 2010/0103305 A1* | 4/2010 | Suda | G03B 13/06 348/333.02 |
| 2010/0164989 A1* | 7/2010 | Margalit | G06F 3/0481 345/629 |
| 2010/0177403 A1* | 7/2010 | Dolgoff | G02B 27/2278 359/629 |
| 2010/0248808 A1* | 9/2010 | Barker | G07F 17/3211 463/20 |
| 2011/0092266 A1* | 4/2011 | Kitamura | G07F 17/32 463/16 |
| 2011/0184805 A1* | 7/2011 | Margalit | G06Q 30/02 705/14.49 |
| 2012/0313839 A1* | 12/2012 | Smithwick | H04N 13/305 345/6 |
| 2013/0314402 A1* | 11/2013 | Furumura | G03B 35/02 345/419 |
| 2015/0009575 A1* | 1/2015 | Kitamura | G02B 27/0101 359/633 |
| 2015/0018092 A1* | 1/2015 | Kitamura | G07F 17/3211 463/30 |
| 2016/0037087 A1* | 2/2016 | Price | H04N 5/2226 348/586 |
| 2016/0041621 A1* | 2/2016 | Naya | H04N 9/3179 345/173 |
| 2016/0127664 A1 | 5/2016 | Bruder et al. | |
| 2016/0139243 A1 | 5/2016 | Send et al. | |
| 2017/0113142 A1* | 4/2017 | Miyamae | G06T 19/00 |
| 2018/0143430 A1* | 5/2018 | Koppal | G02B 27/01 |

OTHER PUBLICATIONS

International Searching Authority, European Patent Office, International Search Report and Written Opinion of the International Searching Authority in PCT application PCT/US2016/069431, dated Jun. 26, 2017.

* cited by examiner

GAME CONSOLE INCORPORATING BEAM-SPLITTER DISPLAY AND REAL WORLD OBJECTS

FIELD OF THE INVENTION

Disclosed and claimed herein is an interactive video game apparatus in which a virtual field of play is transmitted to the player(s) view via a beam-splitter display that enables the player(s) to view the virtual field of play while simultaneously viewing real objects placed behind the beam-splitter display.

BACKGROUND OF THE INVENTION

The art of video games and video gaming apparatus has progressed to the point that many games are described as being "virtual reality" (VR), a somewhat amorphous term. For practical purposes, a VR gaming apparatus places the user in a totally synthetic, computer-generated environment. Thus, in a VR gaming environment, the user interacts with (or is "immersed into") a three-dimensional environment which is entirely computer-generated. In their more sophisticated, computationally demanding versions, VR environments can be photorealistic, three-dimensional spaces. However, everything within the VR environment is not real; every object, surface, and image is computer generated. If the environment allows for the players to be "seen" by other players, they are appear in the VR environment as avatars of the real players—that is, a computer generated image for each player in the game. When immersed in a VR environment, the user does not directly interact with the real-world environment, nor directly interact with the other players in the game.

Video games in general utilize an image generator (typically a programmable computer) to create and control the VR environment which is seen by the user, as well as in response to the user's inputs. Conventionally, this is accomplished by projecting or otherwise manifesting a dynamic, digitally generated motion picture (created by the programmable computer) onto a screen, for example via a cathode ray tube, flat panel display, etc. The image is perceived by the player, who then interacts with the dynamic image via a joy stick or other controller. This, of course, enables the player to alter or otherwise interact with the virtual environment according to the specific rules of the game being played. Conventionally, the display itself is a two-dimensional, flat, opaque surface, and the entire game is played by the player(s) interacting with the virtual images presented on the display. The player(s) do not directly interact, within the game environment, with other players or with real world objects.

SUMMARY OF THE INVENTION

A first version of the console comprises a housing having an open or transparent top, an open or transparent front, and a bottom; a projector situated on the top of the housing; a computer operationally connected to the projector and programmed to execute a video game; at least one controller operationally connected to the computer and dimensioned and configured to control play of the video game; a first beam splitter disposed inside the housing and positioned so that images generated by the projector are at least partially reflected from the first beam splitter and exit the front of the housing; and an award indicator disposed inside the housing at a position such that the beam splitter is situated between the award indicator and the front face of the housing, and wherein at least a portion of light reflecting off of or projected from the award indicator is transmitted through the first beam splitter and exits the front of the housing.

A second version of the console comprises a housing having an open or transparent top, an open or transparent front, an open or transparent back, and a bottom; first and second projectors situated on the top of the housing; a computer operationally connected to the first and second projectors and programmed to execute a video game; at least two controllers operationally connected to the computer and dimensioned and configured to control play of the video game; a first beam splitter disposed inside the housing and positioned so that images generated by the first projector are at least partially reflected from the first beam splitter and exit the front of the housing; a second beam splitter disposed inside the housing and positioned so that images generated by the second projector are at least partially reflected from the second beam splitter and exit the back of the housing; and an award indicator disposed inside the housing between the first beam splitter and the second beam splitter, and wherein at least a portion of light reflecting off of or projected from the award indicator is transmitted through the first beam splitter and exits the front of the housing, and at least a portion of light reflecting off of or projected from the award indicator is transmitted through the second beam splitter and exits the back of the housing.

In another version, the game console comprises a housing having an open or transparent top, an open or transparent front, and a bottom; a projector situated on the top of the housing; a computer operationally connected to the projector and programmed to execute a video game; at least one controller operationally connected to the computer and dimensioned and configured to control play of the video game; a first beam splitter disposed inside the housing and positioned so that images generated by the projector are at least partially reflected from the first beam splitter and exit the front of the housing; a real world object disposed inside the housing at a position such that the beam splitter is situated between the real world object and the front face of the housing, and wherein at least a portion of light reflecting off of or projected from the real world object is transmitted through the first beam splitter and exits the front of the housing; and wherein the projector is dimensioned and configured to project a mask whose image as reflected off the beam splitter is in registration with the real world object when viewed from the front of the housing, and wherein other images projected by the projector are configured to be hidden by the mask when in registration with the mask or are configured to hide the mask when in registration with the mask.

In yet another version, the game console comprises: a housing having an open or transparent top, an open or transparent front, and an open or transparent back; first and second projectors situated on the top of the housing; a computer operationally connected to the first and second projectors and programmed to execute a video game; at least two controllers operationally connected to the computer and dimensioned and configured to control play of the video game; a first beam splitter disposed inside the housing and positioned so that images generated by the first projector are at least partially reflected from the first beam splitter and exit the front of the housing; a second beam splitter disposed inside the housing and positioned so that images generated by the second projector are at least partially reflected from the second beam splitter and exit the back of the housing; a real world object disposed inside the housing between the first beam splitter and the second beam splitter, and wherein at least a portion of light reflecting off of or projected from the real world object is transmitted through the first beam splitter and exits the front of the housing, and at least a portion of light reflecting off of or projected from the real world object is transmitted through the second beam splitter and exits the back of the housing; and wherein the projector is dimensioned and configured to project a mask whose image as reflected off the beam splitter is in registration with the real world object when viewed from the front and rear of the housing, and wherein other images projected by the projector are configured to be hidden by the mask when in registration with the mask or are configured to hide the mask when in registration with the mask.

BRIEF DESCRIPTION OF THE DRAWINGS

FIG. 4A is a view in which projected image 32 is programmed to be behind, or hidden by, mask 51'. FIG. 4B is a view in which projected image 32 is programmed to be behind, or hidden by, mask 51' and projected image 34 is programmed to be in front of, or hiding, mask 51'.

DETAILED DESCRIPTION

The following definitions are used throughout the specification and claims:

"Beam splitter" is used herein to designate a device of any configuration that divides a beam of light or other electromagnetic radiation into two or more separate beams. Beam splitters include prisms and various types of coated glass. Beam splitters, including coated beam-splitting glass that operates in the visual wavelengths is commercially available from a large number of suppliers, such as Edmund Optics (Barrington, N.J.). Beam-splitting glass is typically characterized by its percentage of reflectance (R) versus transmittance (T), the wavelength ranges for reflectance/transmittance, and whether it polarizes the reflected/transmitted image. Any beam splitter that operates in the visual wavelengths may be used in the present console.

"Computer" as used herein means any electronic device that is specially and permanently programmed to generate digital images (still pictures, animation, motion pictures, alpha-numeric text, etc.), to generate sound, and to execute game code (either via software code, hardware-implemented code, firmware-implemented code, or any combination thereof) or any electronic device that can be programmed to generate the images and sounds and to execute the game code (again via software, hardware, firmware, or any combination thereof) needed to play an interactive video game, including (by way of example and not limitation), a single (or multiple) processor-based system that may be supported in a stand-alone (desktop, laptop, personal digital assistant, arcade console), networked, mainframe, or client-server architecture, or other computing environment. The system used may include one or more known storage devices (e.g., Random Access Memory (RAM), Read Only Memory (ROM), hard disk drive (HDD), floppy drive, tape drive, compact disk/write-read-ROM, DVD, bubble memory, flash memory, etc.), and may also include one or more memory devices embedded within a processor, or shared with one or more of the other components. The computer may generate images and execute game code to play any interactive video game of any description, with or without accompanying sounds, music, haptic signals, and the like. The computer may be dimensioned and configured as one or more hardware modules, as one or more software modules, or any combination thereof.

"Controller" is defined broadly to mean any device dimensioned and configured for one or more human users to control game play in an interactive video game, including hardwired and wireless controllers, haptic feedback controllers, motion-sensing controllers and the like, whether now known or developed in the future, and of any configuration or input mechanism. Conventional controllers come in many configurations, all of which are included in the definition "controller." For example, a gamepad or joypad controller is held in one or both hands and the thumb(s) and finger(s) are used to provide input. Gamepads can have a number of action buttons combined with one or more omnidirectional control sticks or buttons. Paddle controllers include a wheel and one or more action buttons, for example a "fire" or "shoot" button. Joystick controllers have a handheld stick that can be tilted around either of two axes and (optionally) twisted around a third. Joystick controllers are often used for flight simulators. Joystick controllers are sometimes combined with a throttle quadrant controller (see below) to yield a "hands-on throttle-and-stick" controller in which action buttons or switches are placed on the joystick itself, thus enabling the player to use the joystick and to execute other actions simultaneously, without having to remove their hands from the joystick. For example, in the context of a flight simulation game, the joystick is conventionally used to control the flight of the virtual aircraft, and buttons on the joystick are used to access other functions, such as releasing virtual bombs or firing virtual weapons. Trackball controllers are essentially an upside-down mouse that is manipulated with the palm and fingers of the players hands. A throttle quadrant controller includes a set of one or more levers that are most often used to simulate throttles or other similar controls in a real vehicle, particularly an aircraft. Throttle quadrants are most popular in conjunction with joysticks or yokes used in flight simulation or submarine simulation. Steering wheel controllers are analogous to the steering wheel of an automobile, and are simply a larger version of a paddle controller designed to emulate the look and feel of a terrestrial vehicle (car, truck, tank, etc.). They are often used in conjunction with foot controllers to emulate the accelerator, brake, and clutch pedals of a manual transmission racing car. Yoke controllers are similar, but are analogous to the yoke used in aircraft and function in the same fashion. Unlike steering wheel controllers, though, yoke controllers have two and sometimes three axes of movement (rotational, up/down/left/right, in/out). Keyboard and mouse combinations are widely used as controllers in games implemented on desktop computers. Touchscreen controllers allow the user to interact with the computer by touching a display screen. Motion sensing controllers interpret a player's physical movements to provide inputs to the gaming system. The Wii-brand controller, for example, uses accelerometers to detect its approximate orientation and acceleration, as well as and an image sensor that enables it to be used a pointing device (such as a virtual firearm). Microsoft's Kinect-brand controller for the Xbox-brand gaming systems uses cameras to track a player's movement. A light gun is a controller that uses a laser or other EM wave to "shoot" virtual targets on the game display. They are often configured to resemble modern or historic firearms or futuristic ray guns, blasters, and the like. Rhythm-type controllers are typically a combination of one or more of the controllers described above, but configured to resemble (and be operated akin to) a musical instrument such as a guitar. See, for example, the controllers described in U.S. Pat. Nos. 6,275,213 6,280,327; 6,285,379; 6,424,333; 6,850,221; 6,878,066; 8,537,231 and 8,986,125, all of which are incorporated herein by reference.

The term "operationally linked" or "operationally connected" means that two or more devices connected by a "linkage" are connected in such a fashion that the linked devices operate in the intended fashion. For example, a computer operationally linked to a projector is connected in such a fashion that digital signal stream encoding images generated by the computer is accurately decoded into an image and the image is projected by the projector. In the same fashion, a controller operationally linked to a computer is capable of controlling the play of the game being executed in code on the computer. The term "linkage" is used herein to designate any kind of operational link that connects the two or more stated devices in an operational fashion. Linkages may be hard wire linkages or wireless linkages of any configuration.

The terms "projector" and "image projector" are used synonymously and are broadly defined to encompass any device dimensioned and configured to project an image visible to the human eye. Included within the definition of "projector" are conventional, cathode ray tube (CRT) projectors, liquid crystal display (LCD) projectors, direct/backlit and edge-lit light emitting diode (LED) projectors, and plasma displays. These are all conventional devices, well-known, and widely available worldwide from a huge host of manufacturers.

Figure 1:
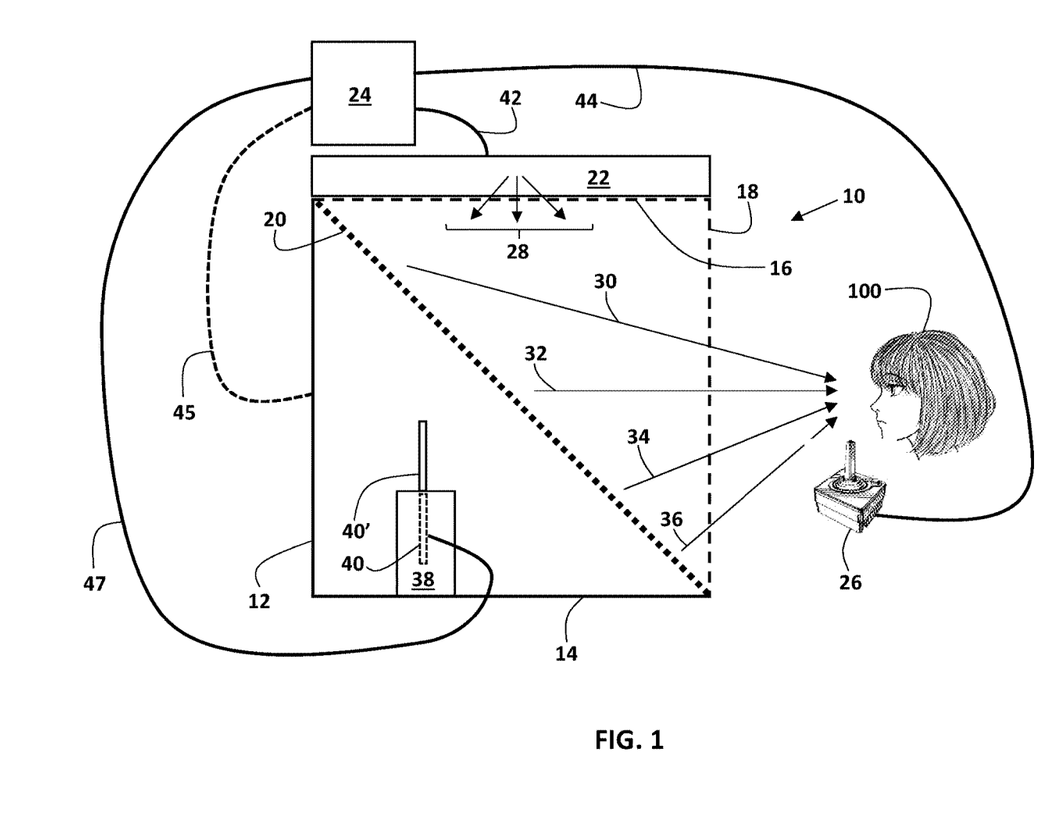
FIG. 1 is a side elevation schematic of a first version of the game console.

Turning now to the figures, the same reference numerals are used throughout the drawings to designate the same or analogous features in each view. FIG. 1 is a side elevation schematic of a first version of the game console. The console includes an enclosure or housing 10. The housing optionally includes a visually transparent front 18, which may be made of a glass or a transparent plastic, for example, a polycarbonate, an acrylic such as poly(methyl methacrylate)), glycol-modified polyethylene terephthalate, and the like. The function of the front 18 is principally to keep dirt, grime and fingerprints off the beam splitter 20 (described below) and to provide structural rigidity to the housing 10. The housing may also optionally include a visually transparent top 16, made from the same materials. The top 16 may be omitted and the projector 22, described below, incorporated directly into the housing 10 as its top surface. As shown in FIG. 1, the back 12 and bottom 14 of the housing may be made from any suitably strong material, such as metal, wood, particle board, etc. The back 12 may be fabricated from transparent materials as well. Left and right sides, not shown in FIG. 1, may be fabricated from the same materials.

Disposed within the housing, at substantially a 45° angle, is a beam splitter 20. The beam splitter 20 may be standard plate glass. However, to convey a crisp, clear image to the user, it is preferred that the beam splitter 20 be a sheet of coated, beam-splitting flat glass having a transmittance/reflectance (T/R) ratio of from about 20/80 to about 80/20, without about 60/40 to about 50/50 generally preferred.

Disposed on top of the housing 10 is a projector 22, of conventional design. The projector 22 is operationally connected by linkage 42 to a processor or computer 24. The computer 24 encodes the video game being played on the console. The computer 24 contains and executes the programming of the game being played and generates a digital signal train that encodes game images, sounds, scoring, etc., in conventional fashion. The digital signal train encoding the images is output to the projector 22 via the linkage 42 and the projector converts the signals into projections or projected images designated by arrows 28. The projector 22 is located in such a fashion that the projected images 28 impinge upon the beam splitter 20, and are reflected so that a user/player 100 can see them. The reflected images seen by the user are shown in FIG. 1 by arrows 30, 32, 34, and 36.

Because of the T/R ratio of the beam splitter 20, the player 100, when looking at the beam splitter as shown in FIG. 1, sees both the reflected images 30, 32, 34, and 36, generated by the projector 22, as well as the transmitted image of the back of the enclosure 12. Thus, the back 12, may have disposed upon it graphics, images, etc., which will be viewable by the player 100. Alternatively, the back 12, may be a second projector operationally connected to the computer 24, as shown by dashed linkage 45. If the back 12 is a second projector, the player 100 simultaneously sees the images 30, 32, 34, 34 reflected from the beam splitter 20, and the transmitted images from the back 12 that pass through the beam splitter 20.

Disposed within the housing, on the back side of the beam splitter 20 (i.e., on the other side of the beam splitter relative to the player 100) is at least one award indicator 40'. The award indicator may be a stand-alone unit or may be a retractable unit housed within enclosure 38. As shown in FIG. 1, the award indicator is show in two positions: at 40' when the award indicator is deployed and at 40 when the award indicator is disposed within enclosure 38. The award indicator is a projector (as defined herein) that is operationally connected to computer 24 as shown by linkage 47 and functions to convey substantive aspects of the game itself and/or game information (such as score, bonus prizes earned, etc.). That is, the images presented on award indicator 40' may comprise part of the game play itself, and/or may convey additional information relevant to the progress or outcome of the game. Because of the T/R ratio of the beam splitter 20, the user also see whatever images or alpha-numeric indicia that are projected from the award indicator 40' simultaneously with the reflected images 30, 32, 34, and 36, and any transmitted image from the back 12.

In this fashion, the console provides the user 100 an immersive, 3-dimensional game-playing experience. The player's 3-D perception of the game is not contrived or artificial, but actual because of the differing focal points of the images reflected from beam splitter 20, as contrasted to the real world objects (such as enclosure 38) and/or images projected from award indicator 40' and back 12 that are transmitted through the beam splitter 20 to the user. The interplay between the reflected images and the transmitted images is visually perceived by the player 100 as a highly complex, 3-dimensional moving image. Game play can thus be highly complex, interactive, and saturated with moving images generated by projector 22, back 12, and/or award indicator 40', many of which will be at different focal points.

The player 100 interacts with the game being played via controller 26, which is operationally connected to the computer 24 by linkage 44. In this fashion, the user 100 uses the controller 26 to play the game.

The actual game being played can be any type, style, or format of video game play, either now known or developed in the future. There are a large number of known formats, including: action games (emphasize physical challenges that require eye-hand coordination and motor skill to overcome)

platform games (players guide a character through obstacles, jumping on platforms and battling enemies in order to advance), fighting games, shooter games, action-adventure games, survival games, text adventure games, interactive movie games, real-time 3D adventure games, role-playing games, massively multiplayer online role-playing games, construction and management simulation games, vehicle simulation games (e.g., drive, flight, dive, train simulations, racing games, space flight simulations), life simulation games, and wargames. All of these (and others) may be played using the current console.

Figure 2:
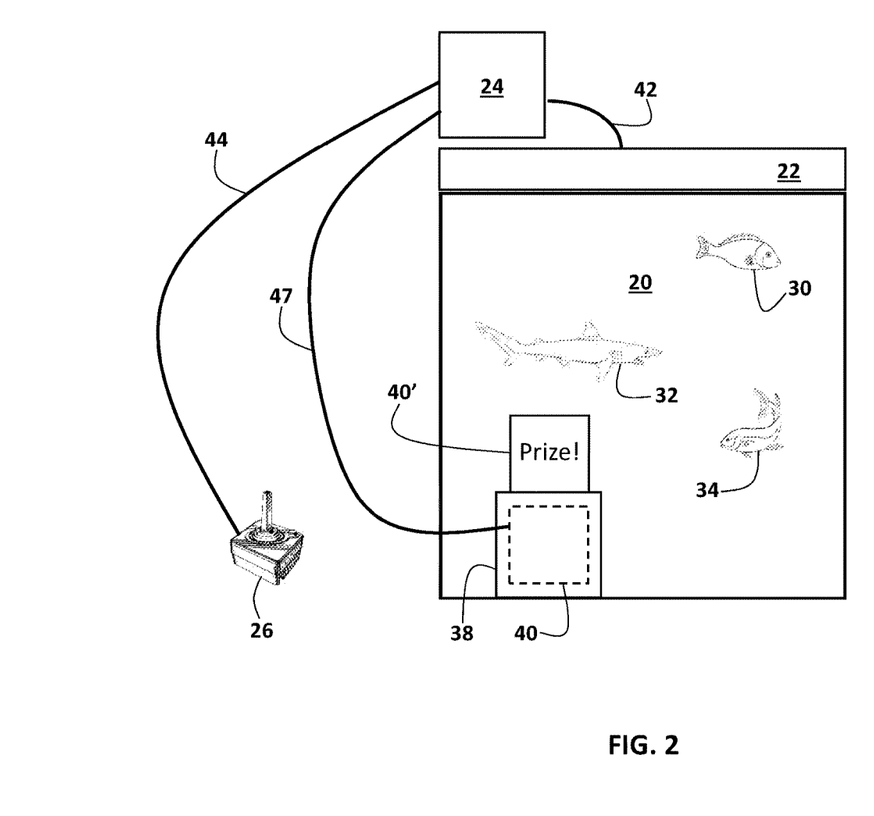
FIG. 2 is a front elevation schematic of the game console shown in FIG. 1.

FIG. 2 is a front elevation schematic of the game console as shown in FIG. 1. The images 30, 32 and 34, generated by the projector 22 and reflected off the beam splitter 20 as illustrated in FIG. 1 are shown in FIG. 2 as fish 30, 32, and 34. The award indicator 40' and its optional enclosure 38 are seen through the beam splitter (rather than reflected from it). That is, the award indicator 40' and its enclosure 38 are behind the beam splitter 20 and light bouncing off these objects (or projected from them in the case of the award indicator 40') is partially transmitted through the beam splitter and seen by the player (who is not shown in FIG. 2). Again, the player simultaneously sees images that are reflected off the beam splitter 20 and images that are transmitted through the beam splitter from objects that are located behind the beam splitter.

Figure 3:
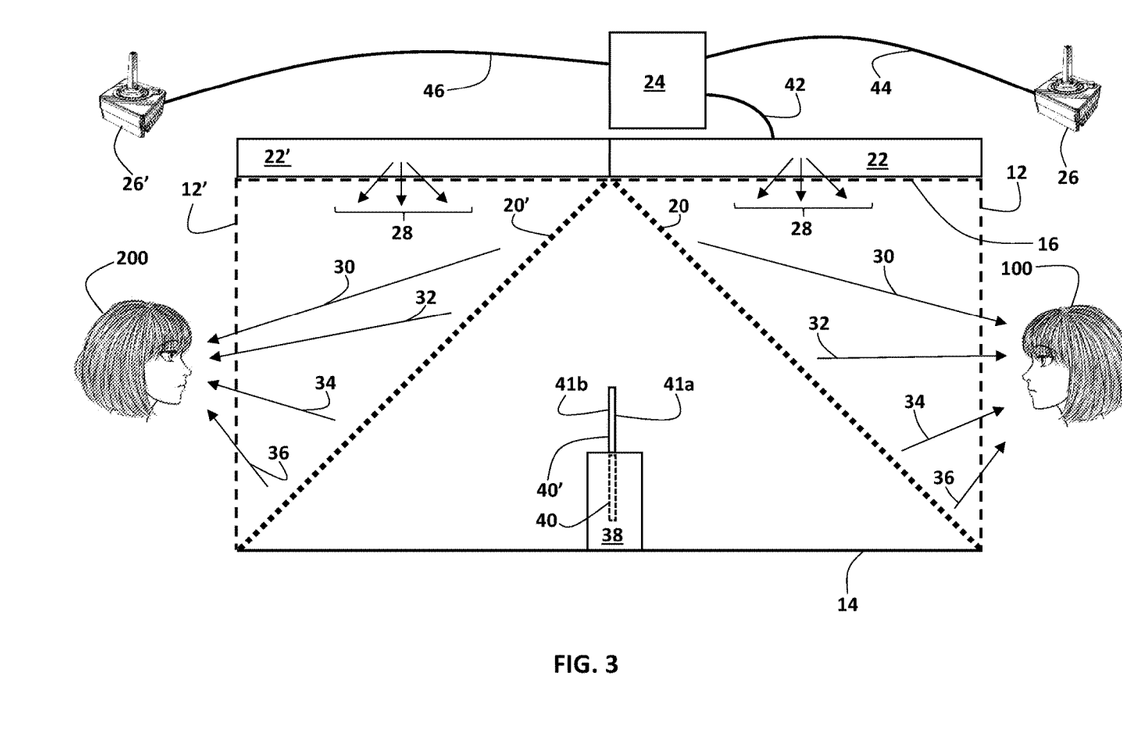
FIG. 3 is a side elevation schematic of a second version of the game console.

FIG. 3 illustrates a variation of the console shown in FIG. 1 in which two beam splitters 20 and 20' are disposed within a housing at about 90° relative to each other and at about 45° relative to a first player 100 (beam splitter 20) and a second player 200 (beam splitter 20'). Because of the T/R ratio of the two beam splitter 20 and 20', the two players can see each other. Two projectors 22 and 22' are provided, in the same fashion as described earlier. These two projectors may be combined into a single, large projector, however, larger projectors tend to be prohibitively expensive. The game play images 28 are projected onto the beam splitters 20 and 20' as described previously. The projected images 28 are reflected off the beam splitters 20 and 20' as previously described, so as to be seen by the players 100 and 200. These images are represented in FIG. 3 by the arrows 30, 32, 34, and 36.

As in the first version, the housing has a bottom 14 and optional transparent front panels 12 and 12' and optional transparent top panel 16. Disposed within the housing, between the beam splitters 20 and 20' is at least one award indicator 40' as described previously. In this version of the console, the award indicator is a two-side projector having projecting surfaces 41a (viewable by player 100) and 41b (viewable by player 200). The award indictor 40' is operationally connected to computer 24 as shown in FIGS. 1 and 2. (The corresponding linkage 47 is omitted from FIG. 3 for clarity.)

As shown in FIG. 3, each player has a corresponding controller: 26' for player 200 and 26 for player 100. Each controller is operationally connected to the computer 24 by linkages 46 and 44. In the same fashion as described earlier, the computer 24 is operationally connected to the projectors 22 and 22' by linkage 42. In this fashion, the two players see not only the images that are reflected from and transmitted through the beam splitters 20 and 20', they also see each other.

Figure 4A:
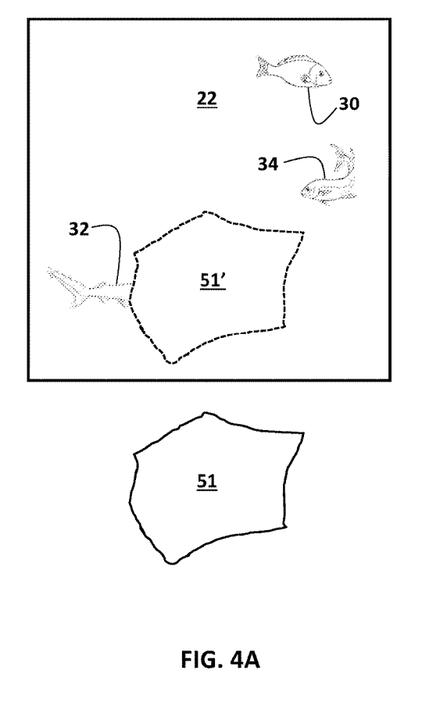
FIGS. 4A and 4B are schematic, bottom side plan views looking directly into projector 22.
Figure 4B:
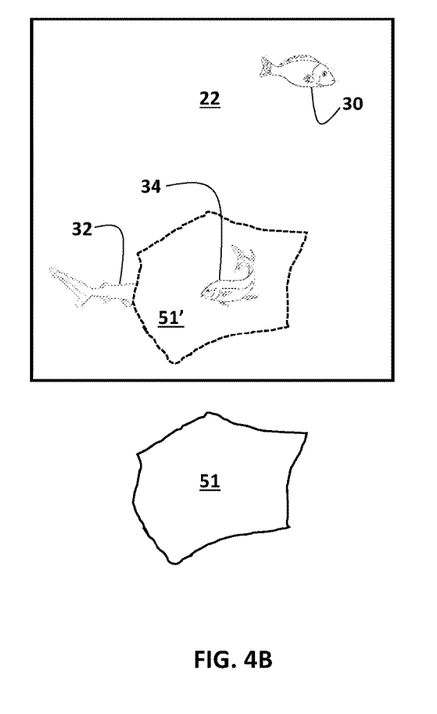

FIGS. 4A and 4B illustrate how the images projected from projector 22 can be made to appear to interact with the real world objects that are placed behind the beam splitter 20 relative to user 100 and behind beam splitter 20' relative to user 200 (as shown in FIG. 3). FIGS. 4A and 4B are bottom plan views looking upward, directly into the projector 22. From this view, the beam splitter is invisible. All that is seen is the direct image projected from the projector, which is again shown as fish 30, 32, and 34. Object 51 represents a real world object, such as the enclosure 38, or any other real world object, that is placed behind the beam splitter 20 or 21' relative to user 100 and/or 200, respectively. The decorative or functional nature of the object is not relevant. Typically, the object would be a decorative element consistent with the theme of the video game being played.

Because the real world object 51 is behind the beam splitter 20 (relative to the player), the images reflected off the beam splitter will always appear to the player to be in front of (i.e., closer to the player) than the real world object. This is because the real world object is behind the beam splitter relative to the player, thus always placing the image reflected off the beam splitter physically closer to the player. However, the images reflected from the beam splitter can be made to appear to behind real world object 51 by projecting an opaque mask 51' from the projector 22. The shape of the mask 51' corresponds to that of the real world object 51, and is projected from the screen in registration with real world object 51. If the real world object 51 is in motion, the mask 51' moves across the projector 22 in registration with the real world object 51. Because the mask 51' is in registration with the real world object 51, its reflection from the beam splitter 20 it is not seen by the players. Additionally, the color of the mask 51' may correspond to the background color or pattern being projected from projector 22. The color or pattern of the mask 51' may be fixed or animated or otherwise dynamic. Thus, the mask 51' is not perceptible to the players. The other projected images, which are viewable by the players, such as fish 30, 32, and 34, can be programmed either to "go behind" the mask 51' (that is, to be hidden by the mask), or to "go in front of" the mask 51' (that is, so that the image hides the mask). In most animation and rendering programs, the relevant computer command is designated "send to back" or "send backward" and "bring to front" or "bring forward."

Thus, as shown in FIG. 4A, the image 32 is "sent backward" of the mask 51'. Because the mask 51' is in registration with the corresponding real world object 51, it appears to the players 100 and 200 that the image/fish 32 swims behind the real world object 51. That is, when the image 32 is "sent backward" to be behind the mask 51', the parts of the image 32 that are superimposed with the mask 51' are no longer projected, and thus appears to the players to disappear behind real world object 51. In contrast, as shown in FIG. 4B, the image 34 has been "brought forward" to be in front of mask 51'. In this situation, the image 34 appears to be in front of real world object 51, while image 32 appears to be behind real world image 51, from the players' perspectives. For the images 30, 32, and 34, the command "send backward" or "bring forward" of the mask 51' may be programmed dynamically (randomly or otherwise) so that the images 30, 32, and 34 will sometimes appear to be behind the real world object 51 and sometimes in front of the real world object 51.

The ability of the two players to see each other adds another layer of complexity to the game play, regardless of whether the game being played is adversarial (for example, a war game that pits player 100 against player 200) or a cooperative (for example, a strategy in which players 100 and 200 are a team). In either instance, the two players are able to communicate with one another verbally and through facial and hand signals.

Numerical ranges as used herein include every number and subset of numbers contained within that range, whether specifically disclosed or not. Further, these numerical ranges are to be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations shall include the corresponding plural characteristic or limitation, and vice-versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The game console disclosed herein can comprise, consist of, or consist essentially of the essential elements and limitations described herein, as well as any additional or optional ingredients, components, or limitations described herein or otherwise useful in the field of arcade game consoles.

What is claimed is:

1. A game console comprising:
   a housing having an open or transparent top and an open or transparent front;
   a projector situated on the top of the housing;
   a computer operationally connected to the projector and programmed to execute a video game;
   at least one controller operationally connected to the computer and dimensioned and configured to control play of the video game;
   a first beam splitter disposed inside the housing and positioned so that images generated by the projector are at least partially reflected from the first beam splitter and exit the front of the housing;
   a real world object disposed inside the housing at a position such that the beam splitter is situated between the real world object and the front face of the housing, and wherein at least a portion of light reflecting off of or projected from the real world object is transmitted through the first beam splitter and exits the front of the housing;
   wherein the projector generates an opaque mask whose shape corresponds to that of the real world object and is projected from the projector in registration with real world object and whose reflection from the beam splitter is not seen by players of the game; and
   wherein at least one other image projected by the projector and reflected off the beam splitter is no longer projected when it is superimposed with the opaque mask.

2. The game console of claim 1, wherein the housing further comprises a back having visible images disposed thereon.

3. The game console of claim 1, wherein the housing further comprises a back, and the back is a second projector operationally connected to the computer.

4. The game console of claim 3, wherein the first beam splitter is a plate of beam-splitting glass having a transmittance/reflectance (T/R) ratio of from about 20/80 to about 80/20.

5. The game console of claim 3, wherein the first beam splitter is a plate of beam-splitting glass having a transmittance/reflectance (T/R) ratio of from about 60/40 to about 50/50.

6. The game console of claim 1, wherein the first beam splitter is a plate of beam-splitting glass having a transmittance/reflectance (T/R) ratio of from about 20/80 to about 80/20.

7. The game console of claim 1, wherein the first beam splitter is a plate of beam-splitting glass having a transmittance/reflectance (T/R) ratio of from about 60/40 to about 50/50.

8. The game console of claim 1, wherein the housing further comprises an open or transparent back; and further comprising
   a second beam splitter disposed inside the housing and positioned so that images generated by the projector are at least partially reflected from the second beam splitter and exit the back of the housing;
   a real world object disposed inside the housing between the first beam splitter and the second beam splitter, and wherein at least a portion of light reflecting off of or projected from the real world object is transmitted through the first beam splitter and exits the front of the housing, and at least a portion of light reflecting off of or projected from the real world object is transmitted through the second beam splitter and exits the back of the housing.

9. The game console of claim 8, wherein the first and second beam splitters are plates of beam-splitting glass having a transmittance/reflectance (T/R) ratio of from about 20/80 to about 80/20.

10. The game console of claim 8, wherein the first and second beam splitters are plates of beam-splitting glass having a transmittance/reflectance (T/R) ratio of from about 60/40 to about 50/50.

11. A game console comprising:
    a housing having an open or transparent top, an open or transparent front, and an open or transparent back;
    first and second projectors situated on the top of the housing;
    a computer operationally connected to the first and second projectors and programmed to execute a video game;
    at least two controllers operationally connected to the computer and dimensioned and configured to control play of the video game;
    a first beam splitter disposed inside the housing and positioned so that images generated by the first projector are at least partially reflected from the first beam splitter and exit the front of the housing;
    a second beam splitter disposed inside the housing and positioned so that images generated by the second projector are at least partially reflected from the second beam splitter and exit the back of the housing;
    a real world object disposed inside the housing between the first beam splitter and the second beam splitter, and wherein at least a portion of light reflecting off of or projected from the real world object is transmitted through the first beam splitter and exits the front of the housing, and at least a portion of light reflecting off of or projected from the real world object is transmitted through the second beam splitter and exits the back of the housing;
    wherein the projector generates an opaque mask whose shape corresponds to that of the real world object and is projected from the projector in registration with real world object and whose reflection from the beam splitter is not seen by players of the game; and wherein at least one other image projected by the projector and reflected off the beam splitter is no longer projected when it is superimposed with the opaque mask.

12. The game console of claim 11, wherein the first and second beam splitters are plates of beam-splitting glass having a transmittance/reflectance (T/R) ratio of from about 20/80 to about 80/20.

13. The game console of claim 11, wherein the first and second beam splitters are plates of beam-splitting glass having a transmittance/reflectance (T/R) ratio of from about 60/40 to about 50/50.

* * * * *